No. 741,584. Patented October 13, 1903.

UNITED STATES PATENT OFFICE.

OSCAR LIEBREICH, OF BERLIN, GERMANY.

PROCESS OF MAKING FATTY SUBSTANCES.

SPECIFICATION forming part of Letters Patent No. 741,584, dated October 13, 1903.

Application filed June 7, 1901. Serial No. 63,637. (No specimens.)

*To all whom it may concern:*

Be it known that I, OSCAR LIEBREICH, medical doctor, a citizen of the German Empire, residing at Berlin, Germany, have invented a new and useful Improvement in Processes of Making Fatty Substances, of which the following is a specification.

The new fatty substances consist of fats, fatty acids, or fat-like substances in admixture with acidulated derivatives of aromatic bases. These mixtures show substantially all of the properties of the fatty compounds contained in the same, which make these fatty compounds fit for the manufacture of candles, wax colors, unguents, hydrophile salves, and other articles; but besides these properties they have a higher melting-point and are more capable of absorbing water than the said fatty compounds. Therefore these new fatty substances form a good raw material for the manufacture of candles, wax colors, hydrophile salves—that is to say, salves which have the property of absorbing water—unguents, &c. A process of producing the acidulated derivatives of aromatic bases is claimed in a separate divisional application, Serial No. 154,902, filed April 28, 1903.

The fatty substances which are described in the present application are here intended to be understood as new products, but are a separable invention not the subject of this application.

Divisional application Serial No. 161,230, filed June 12, 1903, covers, broadly, fatty substances and the process of making the same, as disclosed herein.

Divisional application Serial No. 166,969, filed July 25, 1903, is for fat-like substances and process of making the same, involving, specifically, fat-like substances of mineral origin.

Under the present invention I simultaneously produce the acidulated derivatives of the aromatic bases and their mixture with fats, fatty acids, or fat-like substances, or combinations thereof. I heat together the said fats, fatty acids, or fat-like substances in excess with an aromatic base or bases for a lengthy period in a closed or open vessel. By the reaction of the aromatic bases with the fats, &c., acidulated derivatives of the aromatic bases are formed, whereas the excess of the fats, &c., remains in unaltered condition in mixture with the said-formed acidulated derivatives.

As a specific example under this process I may take one hundred parts of stearic acid and sixteen to twenty-five parts of anilin (half the quantity which theoretically is necessary for the complete conversion of the stearic acid) and heat them together for fifteen hours to 200°. The resulting product, which is a mixture of stearic acid and anilid of stearic acid, has without further purification a melting-point of 68°. The aromatic bases which, among others, may by used are: 1, anilin; 2, bases of the naphthalene series; 3, aromatic diamins; 4, monoalkyl derivatives of the bases named in Nos. 1 to 3; 5, homologues of the bases named in Nos. 1 to 3 and of the monoalkyl derivatives of same.

The following examples show the changes the fats, &c., undergo when in mixture with acidulated derivatives of aromatic bases:

1. Paraffin with melting-point 40° to 41° is raised by an admixture of ten per cent. anilid of stearic acid (melting-point 85°) to a melting-point of 68°.

2. Vaseline which is clearly molten at 29° melts after mixture of twenty per cent. anilid of stearic acid at 76° after an admixture of ten per cent. of the same anilid at 70°.

3. Olive-oil absorbs twenty per cent. water after an admixture of ten per cent. anilid of stearic acid.

4. Eighty parts of stearic acid (melting-point 52°) and twenty parts of benzidid of stearic acid are melted together. The resulting product has a melting-point of 165°.

5. Eighty parts of stearic acid and twenty parts of paratoluidid of stearic acid are melted together. The resulting product has a melting-point of 65°.

6. Eighty parts of stearic acid and twenty parts of beta-naphthylamid of stearic acid are melted together. The resulting product shows a melting-point of 77°.

7. Ninety parts of stearic acid and ten parts of menophenylendiamid of stearic acid are melted together. The resulting product has a melting-point of 85°.

8. Seventy parts of paraffin (melting-point

40° to 42°) and thirty parts of monophenylendiamid of stearic acid are melted together. The product has a melting-point of 104°.

Other substances may be added to the mixture of fats, &c., with acidulated derivatives of aromatic bases, especially substances of such kind as are adapted to assist the application of the product. I may add, for instance, to mixtures which are to be used for the manufacture of candles odorous substances, or to mixtures for salves I may add healing or sterilizing or other medical substances.

Having now fully described my invention, what I claim is—

The process of producing a raw material for candles, wax colors, salves, unguents, &c., which consists in treating fatty compounds containing fats, fatty acids or fat-like substances with an aromatic base, the fatty compounds being in excess so as to form acidulated derivatives of the aromatic base in mixture with the undecomposed fatty matter for substantially the purposes set forth.

Signed this 25th day of May, 1901, at Berlin.

OSCAR LIEBREICH.

Witnesses:
HENRY HASPER,
WOLDEMAR HAUPT.